United States Patent
Z'Rotz et al.

(10) Patent No.: US 12,515,396 B2
(45) Date of Patent: Jan. 6, 2026

(54) POLYMER MATERIAL FOR USE IN A 3D PRINTING PROCESS

(71) Applicant: SIKA TECHNOLOGY AG, Baar (CH)

(72) Inventors: Roy Z'Rotz, Ebikon (CH); Peter Huebscher, Obernau (CH); Robert Roskamp, Altdorf (CH); Herbert Ackermann, Tann (CH)

(73) Assignee: SIKA TECHNOLOGY AG, Baar (CH)

( * ) Notice: Subject to any disclaimer, the term of this patent is extended or adjusted under 35 U.S.C. 154(b) by 434 days.

(21) Appl. No.: 18/026,402

(22) PCT Filed: Nov. 16, 2021

(86) PCT No.: PCT/EP2021/081884
§ 371 (c)(1),
(2) Date: Mar. 15, 2023

(87) PCT Pub. No.: WO2022/106429
PCT Pub. Date: May 27, 2022

(65) Prior Publication Data
US 2024/0017478 A1    Jan. 18, 2024

(30) Foreign Application Priority Data
Nov. 19, 2020  (EP) .................................... 20208746

(51) Int. Cl.
*B29C 64/118*    (2017.01)
*B33Y 10/00*    (2015.01)
(Continued)

(52) U.S. Cl.
CPC ............ *B29C 64/118* (2017.08); *B33Y 10/00* (2014.12); *B33Y 70/00* (2014.12); *B33Y 80/00* (2014.12);
(Continued)

(58) Field of Classification Search
None
See application file for complete search history.

(56) References Cited

U.S. PATENT DOCUMENTS

| | | |
|---|---|---|
| 2015/0119515 A1 | 4/2015 | Frei et al. |
| 2018/0169934 A1 | 6/2018 | Liu et al. |

FOREIGN PATENT DOCUMENTS

| | | | |
|---|---|---|---|
| CN | 106977809 A | 7/2017 | |
| EP | 3643494 A1 * | 4/2020 | ............ B32B 25/10 |

(Continued)

OTHER PUBLICATIONS

Feb. 23, 2022 International Search Report issued in International Patent Application No. PCT/EP2021/081884.
(Continued)

*Primary Examiner* — Mohammad M Ameen
(74) *Attorney, Agent, or Firm* — Oliff PLC

(57) ABSTRACT

A polymer material in manufacture of 3D articles by means of additive manufacturing, the polymer material including: a) at least one propylene polymer P having a flexural modulus determined according to ISO 178:2019 standard of at least 150 MPa, b) at least one propylene-based elastomer PBE having a flexural modulus determined according to ISO 178:2019 standard of not more than 100 MPa, and c) at least one solid inorganic compound SC.

18 Claims, 1 Drawing Sheet

(51) Int. Cl.
  *B33Y 70/00*  (2020.01)
  *B33Y 80/00*  (2015.01)
  *B29K 23/00*  (2006.01)
  *B29K 105/00*  (2006.01)
  *B29K 105/08*  (2006.01)
  *B29K 105/16*  (2006.01)
  *B29L 31/10*  (2006.01)

(52) U.S. Cl.
  CPC ...... *B29K 2023/12* (2013.01); *B29K 2023/16* (2013.01); *B29K 2105/0026* (2013.01); *B29K 2105/08* (2013.01); *B29K 2105/165* (2013.01); *B29L 2031/108* (2013.01)

(56) References Cited

FOREIGN PATENT DOCUMENTS

| | | | |
|---|---|---|---|
| JP | 2015-521679 A | 7/2015 | |
| JP | 2017-095637 A | 6/2017 | |
| JP | 2018-536057 A | 12/2018 | |
| JP | 2019-505863 A | 2/2019 | |
| WO | 2017/082999 A1 | 5/2017 | |
| WO | WO-2019092498 A1 * | 5/2019 | ............. B33Y 70/00 |
| WO | WO-2019221733 A1 * | 11/2019 | |

OTHER PUBLICATIONS

Feb. 23, 2022 Written Opinion issued in International Patent Application No. PCT/EP2021/081884.

* cited by examiner

POLYMER MATERIAL FOR USE IN A 3D PRINTING PROCESS

TECHNICAL FIELD

The invention relates to polymer materials that are suitable for manufacturing of three-dimensional articles by means of additive manufacturing technology. The invention also relates to three-dimensional articles that are suitable for use as roofing detail parts.

BACKGROUND ART

In the field of construction polymeric sheets, which are often referred to as membranes or panels, are used to protect underground and above ground constructions, such as basements, tunnels, or roofs against penetration of water. Roofing membranes are commonly used for waterproofing of flat and low-sloped roof structures. Commonly used materials for roofing membranes and tapes include plastics, especially thermoplastics such as plasticized polyvinylchloride (p-PVC), thermoplastic polyolefin elastomers (TPO, TPE-O), and elastomers such as ethylene-propylene diene monomer (EPDM) rubber.

Roofing membranes must be securely fastened to the roof substrate to provide sufficient mechanical strength to resist the shearing forces applied on it due to high wind loads. This can be realized by using mechanical fastening means, such as using screws and/or barbed plates or by adhesive means, wherein the membrane is adhered to the roof substrate indirectly by using adhesives. Furthermore, adjoining membranes are typically overlapped along the length and width of the membrane at the selvage edge in order to create a continuous waterproofing seal on the surface of the substrate to be waterproofed.

Especially with flat roofs, it is nearly always necessary to use customized roofing detail parts to seal specific roof elements or areas, such as, penetrations, parapets, corners or ducts, against penetration of water. The customized roofing detail parts can for example be pre-shaped tubes or angled pieces. When these are connected in a watertight manner to the sealing material of the main area of the roof, for example membranes, the complete roof area can be sealed in a reliable and durable manner.

Although many individual designs of roofing detail parts are required due to different roof constructions, generic pre-fabricated shapes, which can fit to several different geometries, are typically used. Generic pre-fabricated shapes have the drawback that they do not usually fit perfectly to the actual geometric situation and often need be stressed or bended during installation. Thus, much care has to be taken to properly install and fit these types of roofing detail parts.

Alternatively, custom-made parts specifically adapted for the individual roof designs can be used. However, these must be handcrafted which makes them very expensive in most cases. Another drawback is that handmade parts are typically produced by bonding together elementary shapes produced by injection or pressure molding techniques, which are then joined together by heat-welding or by using adhesive bonding. This increases the risk of material failure resulting from introduction of additional weld or adhesive lines, which are potential weak spots, in particular when considering the thermal stresses resulting from repeated seasonal heating-cooling cycles.

As an alternative to pre-fabricated generic and custom-made roofing detail parts, so called "liquid applied detailing materials" can be used. However, the connection to the other sealing materials on the roof, for example membranes, constitutes a potential weak point regarding water-tightness because the application crucially depends on proper workmanship.

There is thus a need to provide improved solutions, which overcome the aforementioned drawbacks.

BRIEF DESCRIPTION OF FIGURES

In the figures, the same components are given the same reference symbols.

DISCLOSURE OF THE INVENTION

Figure 1:
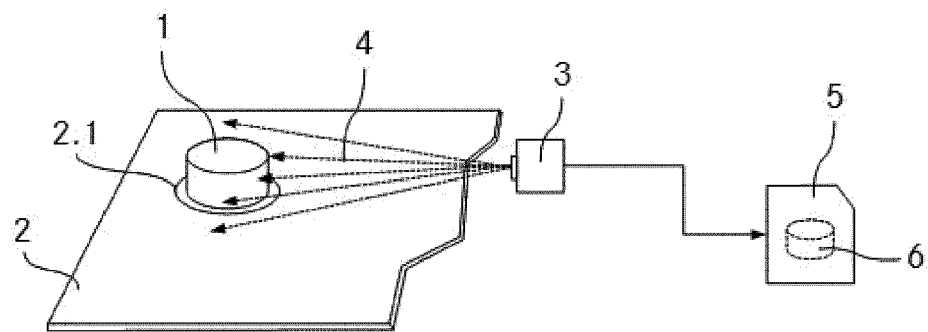
FIG. 1 shows a schematic representation of a section of a flat roof with a duct (1) extending through a roofing membrane (2) whereby the duct (1) is scanned with a 3D scanner (3) for obtaining a digital model (6) of the duct.

It is an object of the present invention to provide a polymer material, which can be used for providing three-dimensional articles, preferably customized roofing detail parts, using a fast and cost-efficient process.

Surprisingly, it has been found out that the object can be achieved by the features of claim 1.

Especially, it has been found out that a polymer material as defined in claim 1 is suitable for use in manufacture of three-dimensional articles by means of additive manufacturing technology, which enables production of customized roofing detail parts with highly complex shapes using a fast and cost-efficient process. Since the produced roofing detail parts do not comprise any weld lines or adhesively bonded sections, the risks of material failure are significantly lower than in using handcrafted roof detailing parts according to prior art.

Advantage of the polymer material of the present invention is that the production of the roofing detail parts by an additive manufacturing process allows for producing a single individualized part at very low costs. Specifically, the costs per part are essentially independent on the lot size. Also, it can be ensured that the roofing detail parts provide the same quality as that of the roofing membranes, which generally are used for waterproofing of large roof areas.

Further subjects of the present invention are defined in further independent claims. Preferred embodiments are outlined throughout the description and the dependent claims.

DETAILED DESCRIPTION

The subject of the present invention is use of a polymer material for the manufacture of three-dimensional articles by an additive manufacturing process, the polymer material comprising:

a) At least one propylene polymer P having a flexural modulus determined according to ISO 178:2019 standard of at least 150 MPa, preferably at least 250 MPa, b) At least one propylene-based elastomer PBE having a flexural modulus determined according to ISO 178:2019 standard of not more than 100 MPa, preferably not more than 75 MPa, and c) At least one solid inorganic compound SC.

The abbreviation 3D is used throughout the present disclosure for the term "three-dimensional.

The term "polymer" refers to a collective of chemically uniform macromolecules produced by a polyreaction (polymerization, polyaddition, polycondensation) of monomers of same of different type where the macromolecules differ with respect to their degree of polymerization, molecular weight and chain length. The term also encompasses derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "molecular weight" refers to the molar mass (g/mol) of a molecule or a part of a molecule, also referred to as "moiety". The term "average molecular weight" refers to the number average molecular weight (Mn) of an oligomeric or polymeric mixture of molecules or moieties. The molecular weight may be determined by gel permeation chromatography.

The term "softening point" refers to a temperature at which compound softens in a rubber-like state, or a temperature at which the crystalline portion within the compound melts. The softening point is preferably determined by Ring and Ball measurement conducted according to DIN EN 1238:2011 standard.

The term "melting temperature" refers to a temperature at which a material undergoes transition from the solid to the liquid state. The melting temperature ($T_m$) is preferably determined by differential scanning calorimetry (DSC) according to ISO 11357-3 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the melting temperature ($T_m$).

The term "glass transition temperature" ($T_g$) refers to the temperature above which temperature a polymer component becomes soft and pliable, and below which it becomes hard and glassy. The glass transition temperature ($T_g$) is preferably determined by dynamical mechanical analysis (DMA) as the peak of the measured loss modulus (G") curve using an applied frequency of 1 Hz and a strain level of 0.1%.

The "amount or content of at least one component X" in a composition, for example "the amount of the at least one thermoplastic polymer TP" refers to the sum of the individual amounts of all thermoplastic polymers TP contained in the composition. Furthermore, in case the composition comprises 20 wt.-% of at least one thermoplastic polymer TP, the sum of the amounts of all thermoplastic polymers TP contained in the composition equals 20 wt.-%.

The term "normal room temperature" designates a temperature of 23° C.

According to ISO 52900-2015 standard, the term "additive manufacturing (AM)" refers to technologies that use successive layers of material to create a 3D objects. In an AM process, the material is deposited, applied or solidified under computer control based on a digital model of the 3D object to be produced, to create the 3D article. The digital model of the 3D article can be created, for example, by using a CAD software or a 3D object scanner.

Additive manufacturing processes are also referred to using terms such as "generative manufacturing methods" or "3D printing". The term "3D printing" was originally used for an ink jet printing based AM process created by Massachusetts Institute of Technology (MIT) during the 1990s. Compared to conventional technologies, which are based on object creation through either molding/casting or subtracting/machining material from a raw object, additive manufacturing technologies follow a fundamentally different approach for manufacturing. Particularly, it is possible to change the design for each object, without increasing the manufacturing costs, offering tailor made solutions for a broad range of products.

Generally, in an AM process a 3D article is manufactured using a shapeless material (e.g. liquids, powders, granules, pastes, etc.) and/or a shape-neutral material (e.g. bands, wires, filaments) that in particular is subjected to chemical and/or physical processes (e.g. melting, polymerization, sintering, curing or hardening). The main categories of AM technologies include VAT photopolymerization, material extrusion, material jetting, binder jetting, powder bed fusion, direct energy deposition, and sheet lamination techniques.

According to one or more embodiments, the additive manufacturing process is a material extrusion process or a powder bed fusion process.

Suitable material extrusion processes include fused filament fabrication and fused particle fabrication. Suitable powder bed fusion processes include multi jet fusion, selective heat sintering, and selective laser sintering.

In a fused filament fabrication (FFF) process, also known as fused deposition modeling (FDM), a 3D article is produced based on a digital model of the 3D article using a polymer material in form of a filament. In a FFF process, a polymer filament is fed into a moving printer extrusion head, heated past its glass transition or melting temperature, and then deposited through a heated nozzle of the printer extrusion head as series of layers in a continuous manner. After the deposition, the layer of polymer material solidifies and fuses with the already deposited layers.

The printer extrusion head is moved under computer control to define the printed shape based on control data calculated from the digital model of the 3D article. Typically, the digital model of the 3D article is first converted to a STL file to tessellate the 3D shape and slice it into digital layers. The STL file is then transferred to the 3D printer using custom machine software. A control system, such as a computer-aided manufacturing (CAM) software package, is used to transform the STL file into control data, which is used for controlling the printing process.

Usually the printer extrusion head moves in two dimensions to deposit one horizontal plane, or layer, at a time. The formed object and/or the printer extrusion head is then moved vertically by a small amount to start deposition of a new layer. A fused particle fabrication (FPF), also known as fused granular fabrication (FGF), differs from a FFF process only in that the polymer material is provided in form of particles, such as granules or pellets, instead of a filament. In a selective laser sintering process, a powdered plastic material is selectively sintered (heated and fused) when exposed to a laser beam.

According to one or more embodiments, the additive manufacturing process is a fused filament fabrication, a fused particle fabrication, or a selective laser sintering process, preferably a fused filament fabrication process or a fused particle fabrication process.

According to one or more embodiments, the at least one propylene polymer P has a flexural modulus determined according to ISO 178:2019 standard of not more than 1500 MPa, preferably not more than 1250 MPa. According to one or more preferred embodiments, the at least one propylene polymer P has a flexural modulus determined according to ISO 178:2019 standard in the range of 150-1350 MPa, even more preferably 250-1250 MPa, more preferably 300-1000 MPa, even more preferably 350-850 MPa, still more preferably 400-750 MPa.

Preferably, the at least one propylene polymer P has a xylene cold soluble fraction determined according to ISO 16152 2005 standard of not more than 60 wt.-%, preferably not more than 50 wt.-%. According to one or more embodiments the at least one propylene polymer P has a xylene cold soluble fraction determined according to ISO 16152 2005 standard in the range of 5-50 wt.-%, preferably 10-45 wt.-%, more preferably 15-40 wt.-%, even more preferably 20-40 wt.-%.

It may furthermore be preferred that the at least one propylene polymer P has:
- a melting point determined as a maximum of the curve determined by means of differential scanning calorimetry (DSC) using the method as defined in ISO 11357-3:2018 standard using a heating rate of 2° C./min of at or above 100° C., preferably at or above 110° C., more preferably at or above 120° C., especially in the range of 120-170° C., preferably 125-160° C., more preferably 125-150° C., even more preferably 125-140° C. and/or
- a melt flow rate (230° C./2.16 kg) determined according to ISO 1133-1 standard of not more than 35 g/10 min, preferably not more than 20 g/10 min, more preferably not more than 15 g/10 min, even more preferably not more than 10 g/10 min, especially in the range of 1-15 g/10 min, preferably 3-10 g/10 min, more preferably 4-10 g/10 min.

According to one or more embodiments, the at least one propylene polymer P comprises 5-70 wt.-%, preferably 10-65 wt.-%, more preferably 15-65 wt.-%, even more preferably 20-60 wt.-%, still more preferably 25-60 wt.-%, of the total weight of the polymer material.

Suitable polymers for use as the at least one propylene polymer P include homopolymers and especially interpolymers of propylene with one or more comonomers that are different from propylene. The term "interpolymer" refers polymers prepared by the polymerization of at least two different types of monomers or comonomers, such as copolymers, terpolymers, and tetrapolymers.

Preferably, the at least one propylene polymer P is an interpolymer of propylene, more preferably a propylene copolymer or a propylene terpolymer, preferably having a propylene content of at least 25 wt.-%, more preferably at least 35 wt.-%, even more preferably at least 45 wt.-%, based on the weight of the interpolymer. The monomer/comonomer content of an interpolymer refers to the total amount of the respective monomer/comonomer given in wt.-% or mol-%. The monomer/comonomer content can be determined by IR spectroscopy or by quantitative nuclear-magnetic resonance (NMR) measurements.

Suitable propylene interpolymers include, for example, propylene-α-olefin interpolymers and heterophasic propylene copolymers.

Especially suitable propylene-α-olefin interpolymers include random and block interpolymers of propylene and one or more C4-C20 α-olefin monomers, in particular one or more of 1-butene, 1-pentene, 1-hexene, 1-heptene, 1-octene, 1-decene, 1-dodecene, and 1-hexadodecene, preferably having a propylene content of at least 25 wt.-%, more preferably at least 35 wt.-%, even more preferably at least 45 wt.-%, based on the weight of the interpolymer.

Suitable propylene-α-olefin interpolymers are commercially available, for example, under the trade name of Eltex® (from Ineos), such as Eltex® P KS 359; under the trade name of Propilco® (from Propilco), such as Propilco® 07R87; under the trade name of PPR® (from Total), such as PPR® 6290; under the trade name of Moplen® (from LyondellBasell), such as Moplen® PR 310 M, Moplen® PR 320 M, and Moplen® PR 220 M; and under the trade name of Clyrell® (from LyondellBasell), such as Clyrell® RC2472.

The term "heterophasic copolymer" refers to specific type of thermoplastic olefin elastomers (TPE-O), which are provided as reactor blends of olefinic constituents. Heterophasic copolymers are polymer systems comprising a high crystallinity base polyolefin and a low-crystallinity or amorphous polyolefin modifier, typically rubber. The heterophasic phase morphology consists of a matrix phase composed primarily of the base polyolefin and a dispersed phase composed primarily of the polyolefin modifier. Commercially available heterophasic copolymers include reactor blends of the base polyolefin and the polyolefin modifier, also known as "in-situ TPOs" or "reactor TPOs". The components of a heterophasic copolymer are typically produced in a sequential polymerization process, wherein the components of the matrix phase are produced in a first reactor and transferred to a second reactor, where the components of the dispersed phase are produced and incorporated as domains in the matrix phase.

A heterophasic copolymer comprising polypropylene homopolymer as the base polymer are often referred to as "heterophasic propylene copolymers (HECO)" whereas heterophasic copolymers comprising propylene random copolymer as the base polymer are often referred to as "random heterophasic propylene copolymers (RAHECO)". The term "heterophasic propylene copolymer" encompasses in the present disclosure both the HECO and RAHECO types of heterophasic propylene copolymers.

Depending on the amount of the polyolefin modifier, commercially available heterophasic propylene copolymers are typically characterized as "impact copolymers" (ICP) or as "reactor-TPOs" or as "soft-TPOs". The main difference between these types of TPOs is that the amount of the polyolefin modifier is typically lower in ICPs than in reactor-TPOs and soft-TPOs, such as not more than 35 wt.-%, particularly not more than 25 wt.-%. Consequently, typical ICPs tend to have a lower xylene cold soluble (XCS) content determined according to ISO 16152:2005 standard as well as higher flexural modulus determined according to ISO 178:2019 standard compared to reactor-TPOs and soft-TPOs.

Suitable heterophasic propylene copolymers are commercially available, for example, under the trade names of Adflex®, Adsyl®, Clyrell®, Hifax®, Hiflex®, and Softell® (all from LyondellBasell) and under the trade name of Borsoft® (from Borealis Polymers), such as Borsoft® SD233 CF.

According to one or more embodiments, the at least one propylene polymer P comprises or consists of at least one random interpolymer P1 of propylene and one or more C4-C20 α-olefin monomers, preferably one or more of 1-butene, 1-pentene, 1-hexene, 1-heptene, 1-octene, 1-decene, 1-dodecene, and 1-hexadodecene, preferably having a propylene content of at least 45 wt.-%, more preferably at least 55 wt.-%, even more preferably at least 65 wt.-%, based on the total weight of the interpolymer.

Generally, the expression "the at least one compound X comprises at least one compound XN", such as "the at least one propylene polymer P comprises at least one random interpolymer P1 of propylene and one or more C4-C20 α-olefin monomers" is understood to mean in the context of the present disclosure that the polymer material comprises one or more random interpolymers P1 as representatives of the at least one propylene polymer P.

According to one or more further embodiments, the at least one propylene polymer P comprises or consists of at least one heterophasic propylene copolymer P2, preferably having a propylene content of at least 45 wt.-%, more preferably at least 55 wt.-%, even more preferably at least 65 wt.-%, based on the total weight of the copolymer, preferably comprising:

A) at least one polypropylene having a melting temperature ($T_m$) of 100° C. or more, preferably a propylene homopolymer and/or a random copolymer of propylene having a comonomer content of less than 20 wt.-%, preferably less than 10 wt.-%, based on the weight of the copolymer and B) at least one polyolefin having a glass transition temperature ($T_g$) of −20° C. or less, preferably an ethylene copolymer having a comonomer content of at least 5 wt.-%, preferably at least 10 wt.-%, based on the weight of the copolymer, preferably having a glass transition temperature ($T_g$) of −25° C. or less, more preferably −35° C. or less, preferably an ethylene-propylene rubber (EPR), wherein the heterophasic propylene copolymer comprises a matrix phase composed primarily of A) and a dispersed phase composed primarily of B).

According to one or more further embodiments, the at least one propylene polymer P comprises or consists of the at least one random interpolymer P1 of propylene and the at least one heterophasic propylene copolymer P2.

According to one or more preferred embodiments, the at least one random interpolymer P1 is a terpolymer, preferably a random terpolymer, of propylene and two C4-C20 α-olefin monomers, preferably ethylene and butene monomers, preferably having a propylene content of at least 50 wt.-%, more preferably at least 60 wt.-%, even more preferably at least 70 wt.-%, based on the total weight of the random terpolymer.

The polymer material further comprises at least one propylene-based elastomer PBE having a flexural modulus determined according to ISO 178:2019 standard of not more than 100 MPa, preferably not more than 75 MPa, more preferably not more than 65 MPa, even more preferably not more than 50 MPa, still more preferably not more than 35 MPa, most preferably not more than 20 MPa.

According to one or more embodiments, the at least one propylene-based elastomer PBE has a xylene cold soluble content determined according to ISO 16152:2005 standard of at least 90 wt.-%, preferably at least 95 wt.-%, more preferably at least 97.5 wt.-%, even more preferably at least 99 wt.-%.

It may further be preferred that the at least one propylene-based elastomer PBE has:
  a softening point determined by Ring and Ball measurement conducted according to DIN EN 1238:2011 standard of not more than 95° C., preferably not more than 75° C., more preferably not more than 70° C., even more preferably not more than 65° C. and/or
  a melt flow rate (230° C./2.16 kg) determined according to ISO 1133 standard of not more than 50 g/10 min,
  preferably not more than 35 g/10 min, more preferably not more than 25 g/10 min and/or
  a density at 23° C. determined according to ASTM D-792 standard of 0.850-0.900 g/cm³, preferably 0.855-0.890 g/cm³.

The at least one propylene-based elastomer PBE is preferably a propylene-ethylene copolymer, preferably a random propylene-ethylene copolymer, having a propylene content of at least 60 wt.-%, preferably at least 70 wt.-%, based on the weight of the copolymer, and an ethylene content of 5-20 wt.-%, preferably 12-18 wt.-%, more preferably 12-16 wt.-%, based on the weight of the copolymer. Particularly suitable propylene-based elastomers are commercially available, for example, under the trade name of Versify® (from Dow Chemicals) and under the trade name of Vistamaxx® (from Exxon Mobil), such as Vistamaxx® 6102 and 6102.

According to one or more embodiments, the at least one propylene-based elastomer PBE comprises 5-75 wt.-%, preferably 10-70 wt.-%, more preferably 15-65 wt.-%, even more preferably 20-65 wt.-%, of the total weight of the polymer material.

According to one or more embodiments, the at least one propylene-based elastomer PBE comprises a first propylene-based elastomer PBE1 having a melt flow rate (230° C./2.16 kg) determined according to ISO 1133-1 standard of at least 15 g/10 min, preferably at least 20 g/10 min and a second propylene-based elastomer PBE2 having a melt flow rate (230° C./2.16 kg) determined according to ISO 1133-1 standard of not more than 10 g/10 min, preferably not more than 5 g/10 min.

According to one or more embodiments, the first propylene-based elastomer PBE1 comprises at least 35 wt.-%, preferably at least 55 wt.-%, more preferably at least 65 wt.-%, even more preferably at least 75 wt.-%, of the total weight of the at least one propylene-based elastomer PBE.

Preferably, the at least one solid inorganic compound SC comprises at least at least 2.5 wt.-%, more preferably at least 3.5 wt.-%, even more preferably at least 4.5 wt.-%, still more preferably at least 5.5 wt.-%, of the total weight of the polymer material. According to one or more embodiments, the at least one solid inorganic compound SC comprises 2.5-50 wt.-%, preferably 3.5-45 wt.-%, more preferably 4.5-40 wt.-%, even more preferably 5-40 wt.-%, of the total weight of the polymer material.

Preferably, the at least one solid inorganic compound SC has a water-solubility of less than 0.1 g/100 g water, more preferably less than 0.05 g/100 g water, even more preferably less than 0.01 g/100 g water, at a temperature of 20° C. The solubility of a compound in water can be measured as the saturation concentration, where adding more compound does not increase the concentration of the solution, i.e. where the excess amount of the substance begins to precipitate. The measurement for water-solubility of a compound in water can be conducted using the standard "shake flask" method as defined in the OECD test guideline 105 (adopted 27 Jul. 1995).

According to one or more embodiments, the at least one solid inorganic compound SC is selected from the group consisting of inorganic fillers, flame retardants, and color pigments.

Suitable inorganic fillers for use as the at least one solid inorganic compound SC include, for example, inert mineral fillers, such as sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, zeolites, and inorganic fibers.

According to one or more embodiments, the at least one solid inorganic compound SC comprises at least one inorganic filler F.

Preferably, the at least one inorganic filler F has a water-solubility of less than 0.1 g/100 g water, more preferably less than 0.05 g/100 g water, even more preferably less than 0.01 g/100 g water, at a temperature of 20° C.

According to one or more embodiments, the at least one inorganic filler F comprises at least 0.5 wt.-%, preferably at least 1.0 wt.-%, more preferably at least 1.5 wt.-%, even more preferably at least 2.5 wt.-%, of the total weight of the polymer material.

According to one or more embodiments, the at least one inorganic filler F comprises at least one filler F1 having a median particle size $d_{50}$ of not more than 250 µm, preferably not more than 150 µm, more preferably not more than 50 µm.

The term "particle size" refers in the present disclosure to the area-equivalent spherical diameter of a particle ($X_{area}$). The term "median particle size $d_{50}$" refers in the present disclosure to a particle size below which 50% of all particles by volume are smaller than the $d_{50}$ value. The particle size distribution can be determined by sieve analysis according to the method as described in ASTM C136/C136M-2014 standard ("Standard Test Method for Sieve Analysis of Fine and Coarse Aggregates).

According to one or more embodiments, the at least one filler F1 is selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, zeolites, and inorganic fibers, preferably from the group consisting of calcium carbonate, magnesium carbonate, clay, expanded clay, diatomaceous earth, pumice, mica, kaolin, talc, dolomite, xonotlite, perlite, vermiculite, Wollastonite, barite, calcium hydroxide, calcium aluminates, silica, fumed silica, and fused silica.

According to one or more embodiments, the at least one filler F1 has a median particle size $d_{50}$ in the range of 1-100 µm, preferably 1.5-50 µm, more preferably 2.5-35 µm, even more preferably 5-25 µm, still more preferably 5-15 µm.

According to one or more embodiments, the at least one inorganic filler F comprises at least one fiber-based filler F2, preferably selected from the group consisting of inorganic fibers, more preferably from the group consisting of milled glass fibers, aramid fibers, wollastonite fibers, and carbon fibers, more preferably milled glass fibers.

According to one or more embodiments, the at least one fiber-based filler F2 has an average fiber length in the range of 100-350 µm, preferably 150-250 µm and/or an average fiber diameter in the range of 5-35 µm, preferably 10-25 µm. The term "average fiber length/diameter" refers to the arithmetic average of the individual lengths/diameters of the fibers within a sample or collection or a statistically significant and representative random sample drawn from such a sample or collection. The term "fiber diameter" refers in the present disclosure to the equivalent diameter of the fiber determined according to EN 14889-2:2006 standard.

The fiber length and diameter may be determined by using dynamic image analysis method conducted according to ISO 13322-2:2006 standard, for example, with a dry dispersion method, where the particles are dispersed in air, preferably by using air pressure dispersion method. The measurements can be conducted using any type of dynamic image analysis apparatus, such as a Camsizer XT device (trademark of Retsch Technology GmbH).

According to one or more embodiments, the at least one solid inorganic compound SC comprises at least one flame retardant FR.

The at least one flame retardant FR is preferably selected from the group consisting of magnesium hydroxide, aluminum trihydroxide, antimony trioxide, ammonium polyphosphate, and melamine-, melamine resin-, melamine derivative-, melamine-formaldehyde-, silane-, siloxane-, and polystyrene-coated ammonium polyphosphates.

Further suitable flame retardants for use as the at least one flame retardant FR include, for example, 1,3,5-triazine compounds, such as melamine, melam, melem, melon, ammeline, ammelide, 2-ureidomelamine, acetoguanamine, benzoguanamine, diaminophenyltriazine, melamine salts and adducts, melamine cyanurate, melamine borate, melamine orthophosphate, melamine pyrophosphate, dimelamine pyrophosphate and melamine polyphosphate, oligomeric and polymeric 1,3,5-triazine compounds and polyphosphates of 1,3,5-triazine compounds, guanine, piperazine phosphate, piperazine polyphosphate, ethylene diamine phosphate, pentaerythritol, borophosphate, 1,3,5-trihydroxyethylisocyanaurate, 1,3,5-triglycidylisocyanaurate, triallylisocyanurate and derivatives of the aforementioned compounds.

Suitable flame retardants are commercially available, for example, under the trade names of Martinal® and Magnifin® (both from Albemarle) and under the trade names of Exolit® (from Clariant), Phos-Check® (from Phos-Check) and FR CROSS (from Budenheim).

According to one or more embodiments, the at least one flame retardant FR comprises 1-60 wt.-%, preferably 1.5-50 wt.-%, 5-40 wt.-%, more preferably 10-35 wt.-%, even more preferably 15-35 wt.-%, of the total weight of the polymer material.

According to one or more embodiments, the at least one solid inorganic compound SC comprises at least one color pigment CP, preferably selected from the group consisting of titanium dioxide, zinc oxide, zinc sulfide, barium sulphate, iron oxide, mixed metal iron oxide, aluminium powder, and graphite.

Preferably, the at least one color pigment CP has a has a median particle size $d_{50}$ of not more than 1000 nm, more preferably not more than 750 µm, even more preferably not more than 500 nm. According to one or more embodiments, the at least one color pigment CP has a has a median particle size $d_{50}$ in the range of 50-1000 nm, preferably 75-750 nm, more preferably 100-650 nm, even more preferably 125-500 µm, still more preferably 150-350 µm, most preferably 200-300 nm.

According to one or more embodiments, the sum of the amount of the at least one filler F1, the amount of the at least one fiber-based filler F2, the amount of the at least one flame retardant FR, and the amount of the at least color pigment CP comprises at least 2.5 wt.-%, preferably at least 3.5 wt.-%, more preferably at least 4.5 wt.-%, even more preferably at least 5.5 wt.-%, of the total weight of the polymer material. According to one or more embodiments, the sum of the amount of the at least one filler F1, the amount of the at least one fiber-based filler F2, the amount of the at least one flame retardant FR, and the amount of the at least color pigment CP comprises 2.5-50 wt.-%, preferably 3.5-45 wt.-%, more preferably 4.5-40 wt.-%, even more preferably 5-40 wt.-%, of the total weight of the polymer material.

The polymer material may further comprise one or more UV-stabilizers, preferably at least one hindered amine light stabilizer (HALS). These types of compounds are typically added to polymer blends to prevent light-induced polymer degradation. Such UV-stabilizers are needed especially in case the three-dimensional article is used in outdoor applications, for example, for waterproofing of roof structures.

Suitable hindered amine light stabilizers (HALS) include, for example, bis (2,2,6,6-tetramethylpiperidyl)-sebacate; bis-5(1,2,2,6,6-pentamethylpiperidyl)-sebacate; n-butyl-3,5-di-tert-butyl-4-hydroxybenzyl malonic acid bis(1,2,2,6,6,-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylenediamine and 4-tert-octylamino-2,6-dichloro-1,3,5-s-triazine; tris-(2,2,6,6-tetramethylpiperidyl)-nitrilotriacetate; tetrakis-(2,2,6,6-tetramethyl-4-piperidyl)-1,2,3,4-butane-tetra-arbonic acid; and 1,1'(1,2-ethanediyl)-bis-(3,3,5,5-tetramethylpiperazinone).

Suitable hindered amine light stabilizers are commercially available, for example, under the trade name of Tinuvin® (from Ciba Specialty Chemicals), such as Tinuvin® 371, Tinuvin® 622, and Tinuvin® 770; under the trade name of Chimassorb® (from Ciba Specialty Chemicals), such as Chimassorb® 119, Chimassorb® 944, Chimassorb® 2020; and under the trade name of Cyasorb® (from Cytec Industries), such as Cyasorb® UV 3346, Cyasorb® UV 3529, Cyasorb® UV 4801, and Cyasorb® UV 4802; and under the trade name of Hostavin® (from Clariant), such as Hostavin N30.

The polymer material may comprise various further additives, such as thermal stabilizers, antioxidants, plasticizers, dyes, matting agents, antistatic agents, impact modifiers, biocides, and processing aids such as lubricants, slip agents, antiblock agents, and denest aids. The total amount of these types of further additives is preferably not more than 15 wt.-%, more preferably not more than 10 wt.-%, even more preferably not more than 5 wt.-%, based on the total weight of the polymer material.

According to one or more embodiments, the polymer material has an elastic modulus determined according to ISO 527-1:2019 standard of not more than 300 MPa, preferably not more than 200 MPa and/or a Shore D hardness determined according to DIN 53505-D:2000 standard of not more than 75, preferably not more than 50. Polymer materials having the elastic modulus and/or Shore D hardness in the above cited ranges have been found out as especially suitable for 3D printing of roofing detail parts.

Another subject of the present invention is a method for producing a 3D article comprising the following steps:
i) Providing a digital model of the 3D article,
ii) Based on the digital model, printing the inventive polymer material as described above using a 3D printer to form the 3D article.

The 3D printer is preferably a fused filament fabrication, fused particle fabrication, or a selective laser sintering printer, preferably a fused filament fabrication or a fused particle fabrication printer.

A "digital model" refers to a digital representation of a real world object, for example of a roofing detail part, that exactly replicates the shape of the object.

Typically, the digital model is stored in a computer readable data storage, especially in a data file. The data file format can, for example, be a computer-aided design (CAD) file format or a G-code (also called RS-274) file format.

According to one or more embodiments, step ii) comprises steps of:
i') Feeding the polymer material into the 3D printer,
ii') Heating the polymer material to provide a melted polymer material,
iii') Depositing the melted polymer material by using a printer extrusion head of the 3D printer in a selected pattern in accordance with the digital model of the 3D article to form the 3D article.

In step ii'), the polymer material is preferably heated to a temperature, which is above the melting temperature of the at least one propylene copolymer P to obtain the melted polymer material. In case the polymer material comprises multiple propylene copolymers P, the polymer material is preferably heated to a temperature, which is above the melting temperature of the propylene copolymer P having the highest melting temperature.

The movements of the printer extrusion head in step iii') are controlled according to control data calculated from the digital model of the 3D article. The digital model of the 3D article is preferably first converted to a STL file to tessellate the 3D shape of the article and to slice it into digital layers. The STL file is transferred to the 3D printer using custom machine software. A control system, such as a computer-aided manufacturing (CAM) software package, is used to generate the control data based on the STL file. The control system can be part of the 3D printer, or it can be part of a separate data processing unit, for example a computer system.

According to one or more embodiments, the 3D article is a roofing detail part for sealing a roofing element.

According to one or more embodiments, the roofing detail part is a cover, a hood, a cap or a revetment and the roof element is a roof curb, a roof drain, a roof edge, a roof expansion joint, a roof parapet wall, a roof penetration, a roof sleeper, a roof transition, a roof corner, a roof tie-in and/or a roof wall.

A wall thickness of the roofing detail part is preferably from 0.1-10 mm, more preferably 1-5 mm. Such parts have been tuned out to be physically stable and watertight while still being flexible enough for installation. However, for specific applications, roofing detail parts with other wall thicknesses may be suitable as well.

Roofing detail parts obtained by using the method for producing a 3D article of the present invention have the advantage that they are compatible with usual sealing materials for roofs, such as roofing membranes. Such roofing detail parts can be easily welded with roofing membranes in order to achieve a watertight connection between the detail part and the main area of the roof.

When the 3D article is a roofing detail part for sealing of a roof element, the digital model of the 3D article can be calculated based on the digital model of the roof element. The digital model of the roofing detail part can be obtained, for example, by taking the outer surface of the digital model of the roof element and generating a surface with negative shape as the inner surface in the digital model of the roofing detail part. An outer surface of the digital model of the roofing detail part can for example be generated by adding a certain wall thickness to the regions behind the inner surface of the digital model of the roofing detail part.

The digital model of the roof element is preferably obtained by 3D scanning of the roof element. 3D scanning is a process of analyzing a real-world object, for example a roof element, to collect data on its shape. The collected data can then be used to construct the digital model of the object. Thereby, a control system can be used to generate the digital model out of the collected data. The control system can be part of the 3D scanner or it can be part of a separate data processing unit, for example a computer system.

With 3D scanning, the real roof element can directly be scanned on top of the roof. This ensures that the digital model is an exact representation of the real roof element to be sealed with the roofing detailing part. However, in principle, it is also possible to obtain the digital model by measuring all of the lengths and angles of the roof element by hand and generating the digital model manually using a modelling software. Nevertheless, this is time consuming and more error-prone than 3D scanning.

There are many different 3D scanners available on the market, which can be used for 3D scanning. Preferably, the scanning of the roof element is performed with a handheld and/or portable 3D scanner. Handheld and/or portable 3D scanners do not need a complicated installation and allow for a quick and easy scanning of the roof element to be sealed.

Preferably, the 3D scanner is designed for capturing objects from 1 cm to 20 m, especially 20 cm to 10 m, in length.

Especially, the 3D scanner is a non-contact 3D scanner. Such kind of scanners emit some kind of radiation, e.g. light, ultrasound or x-rays, and detect its reflection or radiation passing through the object to be scanned in order to probe the object.

For example, the 3D scanner is a scanner of type "calibry 3d scanner" by the company Thor3d, Varshavskoe Sh. 33, Moscow, Russia.

A further subject of the invention is a roofing detail part for sealing of a roofing element, wherein the roofing detail part is composed of the inventive polymer material as described above.

According to one or more embodiments, the roofing detail part is a cover, a hood, a cap or a revetment and the roof element is a roof curb, a roof drain, a roof edge, a roof expansion joint, a roof parapet wall, a roof penetration, a roof sleeper, a roof transition, a roof corner, a roof tie-in and/or a roof wall.

Preferably, the roofing detail part has a single ply structure. Such structures are physically stable and can be produced in a reliable manner using the inventive method.

A wall thickness of the roofing detail part is preferably from 0.1-10 mm, more preferably 1-5 mm. Such parts have been tuned out to be physically stable and watertight while still being flexible enough for installation. However, for specific applications, roofing detail parts with other wall thicknesses may be suitable as well.

Furthermore, the roofing detail part is preferably a monolithic part. With monolithic parts, there is no risk of leakage caused by weld lines or the like. Thus, a monolithic part is much more reliable than a part consisting of several interconnected sections.

Roofing detail parts composed of the polymer material of the present invention have the advantage that they are compatible with usual sealing materials for roofs, such as roofing membranes. Therefore, the roofing detail parts made from the polymer material of the present invention can be easily welded with roofing membranes in order to achieve a watertight connection between the detail part and the main area of the roof.

A further subject of the present invention is a method for sealing a roof element comprising the following steps:
I) Performing the inventive method as described above to obtain a roofing detail part fitting on the roof element,
II) Installing the roofing detail part on the roof element, and
III) Optionally, connecting the installed roofing detail part with a further sealing element on the roof, preferably by heat welding.

Instead for or in addition to heat welding, another method of joining might be used, for example bonding with an adhesive and/or mechanical fastening.

In step III) of the method, the further sealing element can for example be another roofing detail part and/or a sealing material on the main area of the roof, for example a roofing membrane and/or a waterproofing sheet.

DETAILED DESCRIPTION OF FIGURES

On the left side of FIG. 1, a section of a flat roof is shown. Specifically, a roofing membrane (2) is arranged on the top of the flat roof with a roof element in the form of a cylindrical duct (1) extending in vertical direction. In the situation of FIG. 1, the duct (1) extends through a circular opening (2.1) into the roofing membrane (2).

The duct 1 is scanned using a portable 3D scanner (3) with laser light (4) in order to collect data on the shape of the duct (1). The collected data is then processed within the control unit of the scanner (3) and stored in a data file (5) as a digital model (6) of the duct (1). The file format of the data file (5) can, for example, be a CAD file format.

Figure 2:
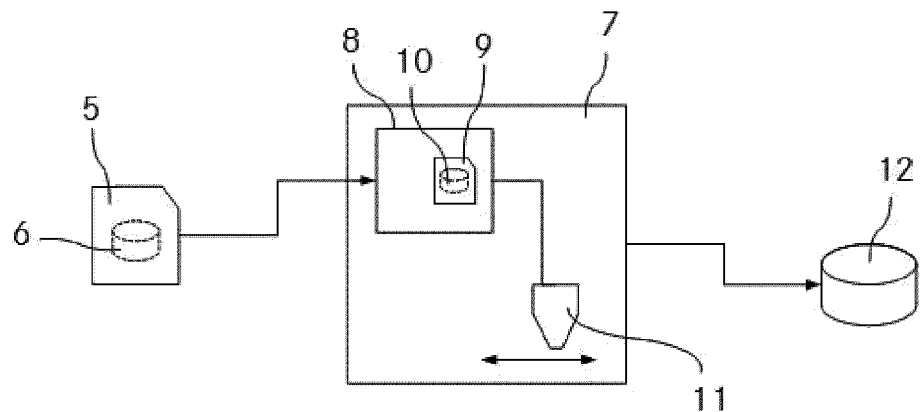
FIG. 2 shows a schematic representation of a 3D printing process whereby a roofing detail part (12) is printed with a 3D printer (7) based on the digital model (6) of the duct (1) of FIG. 1.

As shown in FIG. 2 the data file (5) comprising the digital model (6) of the duct (1) is transmitted to a 3D printer (7). Within the control unit (8) of the 3D printer (7), a digital model (10) of a roofing detail part fitting on duct (1) is generated based on the digital model (6) of the duct (1) and stored in a further data file (9). The negative shape of the outer surface of the digital model (6) of the duct (1) corresponds to the inner surface of the digital model (10) of the roofing detail part.

The control unit (8) of the 3D printer (7) converts the digital model (10) of the roofing detail part into slices, which are then used to generate the control data for the printer extrusion head (11) of the 3D printer (7) to produce the roofing detail part (12) fitting on the duct (1). As seen on the right side of FIG. 2, the roofing detail part (12) is a monolithic hollow cylindrical body having a closed upper end and an open lower end.

Figure 3:
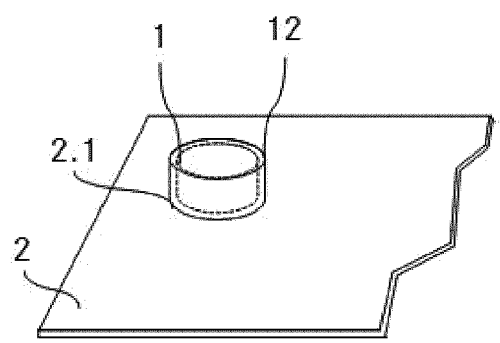
FIG. 3 shows a schematic representation of the flat roof section of FIG. 1 after the roofing detail part (12) of FIG. 2 has been installed on the duct (1) and the roofing detail part (12) has been bonded to the roofing membrane (2) in order to produce a watertight connection between the roofing detail part (12) and the roofing membrane (2).

Once the roofing detail part (12) is ready, it can be installed on the duct (1) as shown in FIG. 3. Thereby, the roofing detail part (12) is connected to the roofing membrane (2) in the region of the opening (2.1), for example, by heat welding all around in order to provide a watertight connection between roofing detail part (12) and roofing membrane (2).

EXAMPLES

The raw materials presented in Table 1 were used in the examples:

TABLE 1

| | |
|---|---|
| Propylene polymer P | Eltex ® P KS 359 |
| Propylene-based elastomer PBE1 | Vistamaxx ® 6202 |

TABLE 1-continued

| | |
|---|---|
| Propylene-based elastomer PBE2 | Vistamaxx ® 6102 |
| Color pigment CP1 | Titanium dioxide; TiO$_2$ content > 92.5 wt.-% (DIN EN ISO 591) |
| Color pigment CP2 | Mixture of inorganic pigments |
| Thermal stabilizer | Blend of phosphit stabilizer and steric hindered phenolic stabilizer |
| HALS1 | Oligomeric hindered amine light stabilizer |
| HALS2 | Hindered amine light stabilizer |
| Flame retardant FR | Aluminum trihydroxide |
| Filler F1 | Calcium carbonate; d$_{50}$ particle size 10 μm |
| Filler F2 | Glass fibers; fiber diameter 14 μm; average fiber length 190 μm |

Elastic Modulus

Elastic modulus of the polymer compositions were determined according to ISO 527-1:2019 standard.

Shore D Hardness

Shore D hardness of the polymer compositions were determined according to DIN 53505-D:2000 standard Manufacture of Filaments The filaments suitable for use fused filament fabrication process were produced according to the following process.

A portion of the respective raw materials of the polymer composition were premixed in a tumbler mixer and then fed to a ZSK laboratory twin-extruder (L/D 44) via a gravimetric dosing scale. Another portion of the raw materials was fed directly via gravimetric dosing trolleys into the laboratory extruder. The raw materials were mixed, dispersed, homogenized and discharged via the holes of perforated extrusion nozzles. The extruded strands were cooled using a water bath and cut into granules with suitable dimensions. The granules were then dried in an oven to remove the residual moisture.

The granules produced as described above were processed into filaments having a cross-sectional diameter of ca. 1.75 mm using a Collin E 20T single-screw extruder with a perforated nozzle and a conveyor belt. The produced filaments were then wound onto spools.

3D Printing Properties of Polymer Compositions

Suitability of the polymer compositions for the manufacture of 3D articles by material extrusion 3D printing was tested by using the filaments produced as described above as feed material in a fused filament fabrication process. 3D articles having a form a cube with dimensions of 40 mm×40 mm and composed of 103 layers were manufactured from the filaments using a Zortrax M200 filament fusion fabrication 3D printer. The suitability of each polymer composition for material extrusion 3D printing was estimated based on properties of the 3D printed articles (cubes). The properties of the 3D printed articles were evaluated in terms of the observed shrinkage in machine direction (md, horizontal) and cross machine direction (cd, vertical). The shrinkage was determined as measured length—specified length (40 mm). The number of defects was evaluated visually and averaged over the four vertical sides of the 3D printed article.

The constituents and properties of the polymer compositions and properties of the 3D printed articles are presented in Table 2.

TABLE 2

| Compositions [wt.-%] | Ref-1 | Ex-1 | Ex-2 | Ex-3 | Ex-4 | Ex-5 | Ex-6 | Ex-7 | Ex-8 | Ex-9 |
|---|---|---|---|---|---|---|---|---|---|---|
| Propylene polymer P | 37.0 | 34.6 | 24.7 | 43.3 | 55.3 | 36.9 | 27.6 | 25.6 | 27.9 | 23.3 |
| Propylene-based elastomer PBE1 | 63.0 | 58.9 | 42.0 | 23.3 | 32.3 | 48.8 | 55.3 | 31.9 | 24.4 | 42.8 |
| Propylene-based elastomer PBE2 | 0.0 | 0.0 | 0.0 | 0.0 | 4.6 | 6.5 | 9.2 | 6.4 | 10.5 | 11.7 |
| Color pigment CP1 | 0.0 | 5.6 | 1.3 | 1.3 | 5.5 | 5.5 | 5.5 | 3.8 | 4.2 | 4.7 |
| Stabilizer | 0.0 | 0.0 | 0.0 | 0.0 | 0.1 | 0.1 | 0.1 | 0.1 | 0.1 | 0.1 |
| HALS1 | 0.0 | 0.0 | 0.0 | 0.0 | 0.7 | 0.7 | 0.7 | 0.5 | 0.5 | 0.6 |
| HALS2 | 0.0 | 0.0 | 0.0 | 0.0 | 0.7 | 0.7 | 0.7 | 0.5 | 0.5 | 0.6 |
| Color pigment CP2 | 0.0 | 0.0 | 0.0 | 0.0 | 0.8 | 0.8 | 0.8 | 0.6 | 0.6 | 0.7 |
| Flame retardant FR | 0.0 | 0.0 | 32.0 | 32.0 | 0.0 | 0.0 | 0.0 | 30.7 | 0.0 | 0.0 |
| Filler F1 | 0.0 | 0.9 | 0.0 | 0.0 | 0.0 | 0.0 | 0.0 | 0.0 | 0.0 | 11.7 |
| Filler F2 | 0.0 | 0.0 | 0.0 | 0.0 | 0.0 | 0.0 | 0.0 | 0.0 | 31.4 | 3.9 |
| Total | 100.0 | 100.0 | 100.0 | 100.0 | 100.0 | 100.0 | 100.0 | 100.0 | 100.0 | 100.0 |
| Properties | | | | | | | | | | |
| Elastic Modulus [MPA] | 52 | 58 | 143 | 60 | 178 | 73 | 24 | 146 | 161 | 36 |
| Shore D | 35 | 35 | 39 | 35 | 45 | 33 | 29 | 45 | 47 | 31 |
| Number of defects | 87 | 7 | 22 | 0 | 8 | 9 | 12 | 0 | 0 | 0 |
| Shrinkage md [%] | −7.3 | −2.6 | −0.3 | −4.7 | −2.4 | −1.9 | −2.1 | −0.8 | −1.1 | −1.9 |
| Shrinkage cd [%] | −9.7 | −3.1 | −2.9 | −1.7 | −2.5 | −2.4 | −0.8 | 0 | −0.6 | −0.3 |

The invention claimed is:

1. A method for producing a 3D article comprising the following steps:
   i) providing a digital model of the 3D article; and
   ii) based on the digital model, printing a polymer material using a 3D printer to form the 3D article, wherein the polymer material comprises:
   a) at least one propylene polymer P having a flexural modulus determined according to ISO 178:2019 standard of at least 150 MPa,
   b) at least one propylene-based elastomer PBE having a flexural modulus determined according to ISO 178: 2019 standard of not more than 100 MPa, and
   c) at least one solid inorganic compound SC.

2. The method according to claim 1, wherein the method is a fused filament fabrication process or a fused particle fabrication process.

3. The method according to claim 1, wherein the at least one propylene polymer P has a flexural modulus determined according to ISO 178:2019 standard of not more than 1500 MPa and/or a xylene cold soluble fraction determined according to ISO 16152 2005 standard of not more than 60 wt.-%.

4. The method according to claim 1, wherein the at least one propylene polymer P comprises 5-70 wt.-% of the total weight of the polymer material.

5. The method according to claim 1, wherein the at least one propylene-based elastomer PBE is a propylene-ethylene copolymer having a propylene content of at least 60 wt.-% based on the weight of the copolymer and an ethylene content of 5-20 wt.-% based on the weight of the copolymer.

6. The method according to claim 1, wherein the at least one propylene-based elastomer PBE comprises 5-75 wt.-% of the total weight of the polymer material.

7. The method according to claim 1, wherein the at least one propylene-based elastomer PBE comprises a first propylene-based elastomer PBE1 having a melt flow rate (230° C./2.16 kg) determined according to ISO 1133-1 standard of at least 15 g/10 min and a second propylene-based elastomer PBE2 having a melt flow rate (230° C./2.16 kg) determined according to ISO 1133-1 standard of not more than 10 g/10 min.

8. The method according to claim 1, wherein the at least one solid inorganic compound SC comprises at least at least 2.5 wt.-% of the total weight of the polymer material.

9. The method according to claim 1, wherein the at least one solid inorganic compound SC comprises at least one inorganic filler F.

10. The method according to claim 1, wherein the at least one solid inorganic compound SC comprises at least one flame retardant FR.

11. The method according to claim 1, wherein the at least one solid inorganic compound SC comprises at least one color pigment CP.

12. The method according to claim 1, wherein the polymer material has an elastic modulus determined according to ISO 527-1:2019 standard of not more than 200 MPa and/or a shore D hardness determined according to DIN 53505-D: 2000 of not more than 75.

13. The method according to claim 1, wherein the 3D printer is a fused filament fabrication printer.

14. The method according to claim 1, wherein the 3D printer is a fused particle fabrication printer.

15. The method according to claim 1, wherein the 3D article is a roofing detail part for sealing of a roof element.

16. The method according to claim 15, wherein the digital model of the roofing detail part is calculated based on a digital model of the roof element.

17. A roofing detail part for sealing of a roofing element, wherein the roofing detail part is obtained by the method of claim 15.

18. The method according to claim 1, wherein the at least one propylene polymer P has a flexural modulus determined according to ISO 178:2019 standard of not more than 1250 MPa and/or a xylene cold soluble fraction determined according to ISO 16152 2005 standard of not more than 60 wt.-%.

* * * * *